United States Patent [19]
Storm et al.

[11] 3,982,790
[45] Sept. 28, 1976

[54] AERODYNAMIC PRODUCT UNSCRAMBLING SYSTEM AND METHODS OF CONSTRUCTING AND UTILIZING SAME

[76] Inventors: Donald William Storm, 5758 Upper Straits Blvd., Orchard Lake, Mich. 48033; Carl Curtis Garland, 15700 Kentfield, Detroit, Mich. 48223

[22] Filed: Apr. 4, 1975

[21] Appl. No.: 565,247

[52] U.S. Cl. ............................................. 302/31
[51] Int. Cl.² ...................................... B65G 53/04
[58] Field of Search ................ 302/29, 31, 2 R; 209/115

[56] References Cited
UNITED STATES PATENTS

| | | | |
|---|---|---|---|
| 2,342,680 | 2/1944 | Melzer | 302/2 R |
| 3,210,124 | 10/1965 | Niemi et al. | 302/2 R |
| 3,685,632 | 8/1972 | Brady | 302/31 |
| 3,731,823 | 5/1973 | Goth | 302/31 |

*Primary Examiner*—Allen N. Knowles
*Attorney, Agent, or Firm*—Irving M. Weiner; Pamela S. Burt

[57] ABSTRACT

An aerodynamic product unscrambler which automatically separates, meters, and indexes individual products into a desired arrangement. The products to be separated and arranged are brought into the aerodynamic unscrambling apparatus in a random arrangement or any systematic or unsystematic arrangement. The products pass between a template guide structure and a series of louvers from which emanate streams of a fluid to carry along the product. The template guide structure is variable or interchangeable to accommodate various cross sections of different products.

10 Claims, 7 Drawing Figures

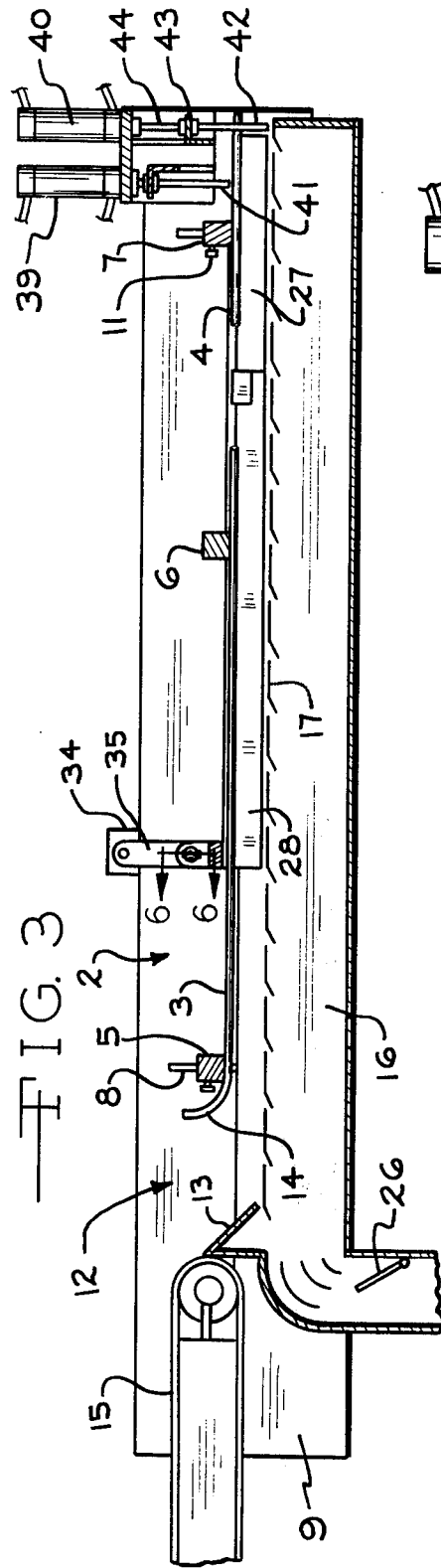
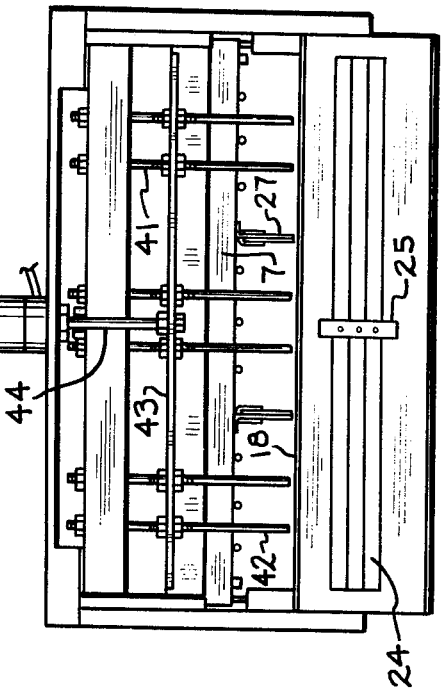
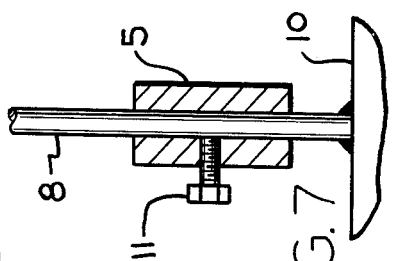
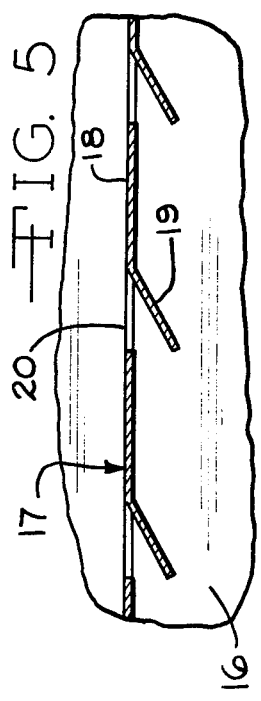

AERODYNAMIC PRODUCT UNSCRAMBLING SYSTEM AND METHODS OF CONSTRUCTING AND UTILIZING SAME

The present invention relates generally to a method and apparatus for automatically and selectively controllably transporting articles or products into a predetermined arrangement of such articles or products. In particular, the present invention relates to an aerodynamic feeding and sorting system, and methods of constructing and utilizing same.

BACKGROUND OF THE INVENTION

Heretofore, various attempts have been made to attain automatic feeding and sorting devices which have primarily been mechanical in nature. Such prior art mechanical systems have a host of various attendant disadvantages and problems. For example, such prior art mechanical systems invariably require constant human attention and labor to clear various jam-ups and malfunctions and undesired destruction of the articles or products being sorted and fed.

In addition, such prior art mechanical systems are extremely complicated, cumbersome, and constantly plagued with down-time to accomplish various repairs and maintenance thereof. Furthermore, such mechanical systems invariably require conveyor belts, gates, and various cams and stopping mechanisms in order to sort and feed the products being handled.

Moreover, the prior art developments are in the main incapable of handling various comestibles and other fragile items without the equipment itself damaging the items or articles being handled.

It is a principal object of the present invention to provide an apparatus or aerodynamic unscrambling system which can handle and sort heavy and light articles, as well as perishable and fragile articles, without the various disadvantages and problems attendant to the prior art developments as described hereinabove.

SUMMARY OF THE INVENTION

The present invention provides an apparatus for automatically and selectively controllably transporting articles into a predetermined arrangement of such articles. The novel apparatus includes main guide means, and entrance guide means operably connected to and communicating with the main guide means. First means are provided for transporting the articles into the entrance guide means. Second means are provided for selectively supplying and directing at least one fluid to the main guide means at a selectively adjustable and predetermined pressure and quantity, and at a selectively adjustable and predetermined direction. The apparatus also includes article separating means operably connected to and disposed within the main guide means. The articles are transported through the entrance guide means and into the main guide means wherein the articles are selectively and adjustably controllably transported along by such fluid. The article separating means separates the articles into a selectively adjustable and predetermined arrangement of such articles as the articles are simultaneously transported along by the fluid.

The terminology "fluid" as used herein is intended to connote gases, liquids, or anything which is capable of flowing, or any combinations of the foregoing substances.

An object of the presentn invention is to provide an aerodynamic or fluid unscrambling device which is capable of accepting articles in a random array, and sorting and feeding such articles into a predetermined arrangement.

It is a further object of the present invention to provide an apparatus wherein the pressure at the entrance section of the apparatus is substantially the same as or equal to the pressure at the exit section of the apparatus.

The present invention also provides a novel apparatus which is capable of accepting articles being fed from a customer conveyor into the novel apparatus wherein such articles are transported along on a fluid bed into a predetermined arrangement, and also wherein the path of movement of such articles is such that the articles may be stopped and started where desired in order to perform various operations thereon. For example, such operations may include coating of said articles, or individually wrapping or packaging said articles, or injecting a food substance into the center of such articles, etcetera.

It is a further object of the present invention to provide an aerodynamic apparatus which is capable of being used for automatically sorting and feeding various heavy and light objects, such as, for example, doughnuts, trays, buns, packages of cigarettes, absorbent cotton bowls, various grocery and food items, etcetera. Furthermore, at the exit end of such novel apparatus the articles or products are presented in a predetermined arrangement or group ready for packaging in a carton, box or the like.

Another object of the present invention is to provide an unscrambling apparatus wherein the baffles employed may be fixed or variable.

It is yet another object of the present invention to provide a sorting and feeding appartus wherein the template guide structure is interchangeable, or variable, or adjustable, in order to accommodate the different cross sections of various products or articles being handled and sorted.

Other objects and advantages of the present invention will appear from the following description and appended claims, reference being had to the accompanying drawings forming a part of this specification wherein like reference characters are intended corresponding designate corresponding parts in the several views.

BRIEF DESCRIPTION OF THE DRAWINGS

FIG. 3 illustrates a longitudinal elevational cross-sectional view taken along the plane 3—3 shown in FIG. 2.

FIG. 4 represents a view of the exit section of the apparatus taken from the right-hand side as viewed in FIG. 3.

FIG. 5 illustrates an exploded or enlarged view of the novel louver arrangement.

FIG. 6 illustrates a cross-sectional view of a portion of the apparatus, on an enlarged scale, taken along the line 6—6 shown in FIG. 3.

FIG. 7 shows a cross-sectional view of the apparatus, also on an enlarged scale, taken along the plane 7—7 shown in FIG. 2.

DETAILED DESCRIPTION OF SOME PREFERRED EMBODIMENTS OF THE PRESENT INVENTION

Before explaining the present invention in detail, it is to be understood that the present invention is not limited in its application or uses to the details of construction and arrangement of parts illustrated in the accompanying drawings, because the present invention is capable of other embodiments, variations and modifications, and of being practiced or carried out in various ways. Furthermore, it is to be understood that the phraseology or terminology employed herein is for the purpose of description and illustration, and not of limitation.

Figure 1:
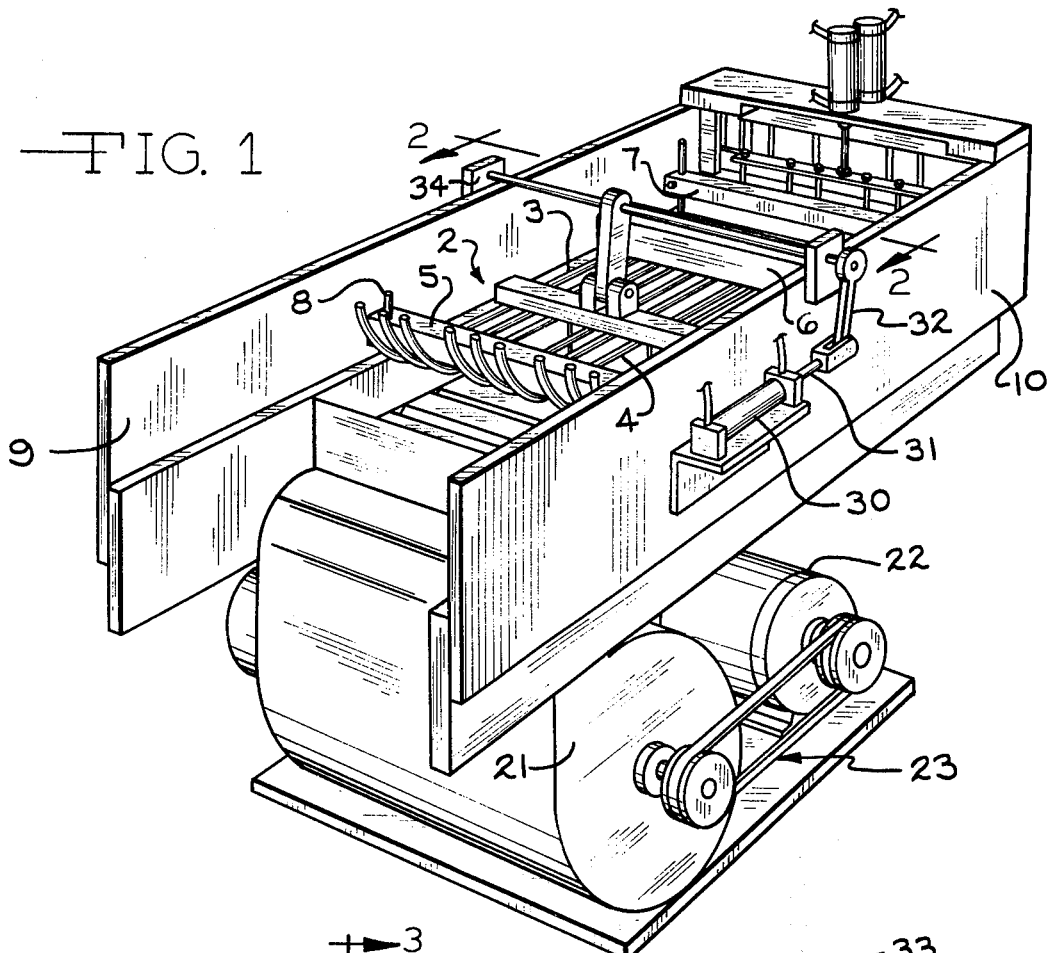
FIG. 1 illustrates a perspective view of a first possible embodiment of the present invention with the customer conveyor omitted to facilitate clarity of illustrations and understanding.

With reference to FIG. 1, there is shown an apparatus, according to a first possible embodiment of the present invention, for automatically and selectively controllably transporting articles into a predetermined arrangement of such articles. The embodiment of the invention illustrated in the accompanying drawings will be described hereinbelow with reference to transporting articles such as jelly doughnuts. However, it is to be understood that the invention is not to be limited to use in connection with doughnuts, but may be used in connection with any suitable product or article. Three such doughnuts 1 are illustrated in FIG. 2.

Figure 2:
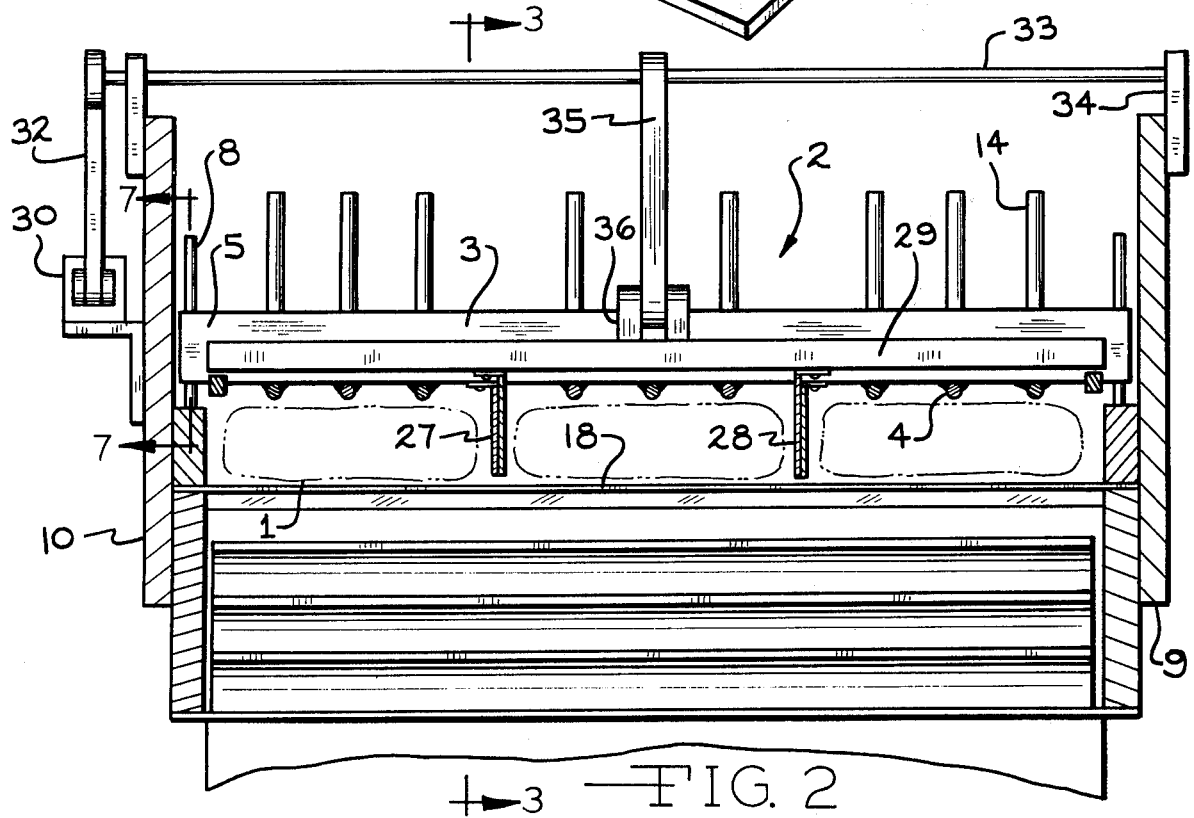
FIG. 2 depicts a cross-sectional view of the apparatus shown in FIG. 1 taken along the plane 2—2 shown in FIG. 1.

As best shown in FIGS. 1, 2 and 3, the apparatus includes main guide means 2 having a template guide structure 3 which is shaped and dimensioned so as to permit the doughnuts 1 to move therethrough with a minimum of resistance and obstruction.

The template guide structure 3 may include a series of elements or rods 4 which are spaced apart in a predetermined arrangement in order to accommodate the doughnuts 1 and to facilitate movement therealong of the doughnuts 1 (see FIGS. 1, 2, 3 and 4). The rods 4 may be fixedly, or variably or adjustably affixed to transverse members 5, 6 and 7, as illustrated in FIGS. 1–4 and 7.

The entire template guide structure 3 may be adjustably and removably mounted on posts 8 which are fixed to and project upwardly from side frame members 9 and 10. Such adjustable and removable mounting of the template guide structure 3 may be accomplished by means of set screws 11 which pass through the transverse members 5, 6 and 7 for removable tightening against the posts 8 (see FIG. 7).

With reference to FIG. 3, there is shown that the apparatus is also provided with entrance guide means 12 which includes a ramp 13 and arcuate means 14. The arcuate means 14 may, for example, be a solid curved member, or may, as illustrated in the drawings, be curved continuations of the rods 4 disposed forwardly of or to the left of transverse member 5 as viewed in FIG. 3. The entrance guide means 12 is operably connected to and communicates with the main guide means 2.

As shown in FIG. 3, there may be provided first means, such as a customer conveyor 15, for transporting the doughnuts 1 into the entrance guide means 12. In connection with the particular application and embodiment described, the customer conveyor 15 may, for example, constitute the exit conveyor of a baking apparatus (not shown) which carries a plurality of baked doughnuts dispersed in a random fashion on the conveyor 15.

The apparatus also includes second means for selectively supplying and directing at least one fluid to the main guide means 2 at a selectively adjustable and predetermined pressure and quantity, and at a selectively adjustable and predetermined direction. When the particular fluid employed is air, such second means may include an air duct 16 provided with a plurality of fixed or adjustable louvers 16, a mechanism for blowing air into the air duct 16, and an air pressure regulating means for controlling the pressure of the air in the air duct 16.

The louvers 17 are best seen in FIG. 5, and may comprise a substantially horizontal top portion 18 and an oblique portion 19. Between adjacent louvers 17 there is provided an adjustable and/or predetermined gap 20 through which the air may pass from the inside of the air duct 16 into the adjacent main guide means 2 disposed thereabove.

Reverting to FIG. 1, the mechanism for blowing air into the air duct 16 may include a belt-driven blower 21 which is driven by means of a motor 22 connected to blower 21 by means of a pulley and belt arrangement 23. Many conventional motor and blower combinations may be used, such as, for example, a Dayton high-pressure, belt-driven blower with 13 ½ inch diameter self-cleaning, radial blade wheels, which is driven by a three-phase electric motor.

The blower 21 may be provided with an air filter (not shown), and the air is directed upwardly through the vertical portion of the air duct 16 shown in FIG. 3. The air pressure regulating means for controlling the pressure of the air in the air duct 16 may comprise any suitable conventional air pressure regulating means. For the particular embodiment described in detail herein, such air pressure regulating means may, for example, include a series of louvers 24 which may be adjustably positioned between a completely closed position and a completely open position by a handle 25, as shown in FIG. 4, and may also include a movable baffle 26 shown in FIG. 3 in the vertical portion of the air duct 16. The air supplied to the air duct 16 is directed outwardly by the louvers 17 through the air gaps 20 to lift the doughnuts 1 and at the same time supply a substantially horizontal translatory component to the doughnuts 1 so that the doughnuts will pass from left to right as viewed in FIG. 3. Thus, the doughnuts 1 are aerodynamically transported along on one or more streams of air supplied by the second means.

With reference to FIG. 2, it can be seen that the lower surface of the doughnuts 1 rides on a bed of air slightly above, but not in contact with, the top horizontal portions 18 of the main louvers 17. The upper surface of the doughnuts 1 is in physical contact with a minimal surface, viz, tangential contact with the lower portion of elements or rods 4 which form part of the template guide structure 3. From the foregoing, it should be understood that the primary function of the template guide structure 3 is merely to channel or guide the doughnuts 1 and their substantially horizontal translatory movement within the main guide means 2, while providing a minimum of drag, or resistance or hinderance to such substantially horizontal translatory movement. At the same time, the template guide structure 3 provides a back-up structure so that the doughnuts 1 will not be lifted to an excessive extent above the louvers 17.

Reverting again to FIG. 3, a random distribution of the doughnuts 1 emanating from the exit section of baking machinery (not shown) are transported from left to right as viewed in FIG. 3 along the top surface of the customer conveyor 15. The doughnuts 1 drop off of the rightmost end of the the conveyor 15 into the entrance guide means 12 formed by the ramp 13 and the arcuate means 14.

The doughnuts passing through the bottom of the entrance guide means 12 are met by the air emanating through the gaps 20 in the louvers 17. The air is specially directed and pressure controlled to cause the doughnuts 1 to aerodynamically ride on a bed of air and at the same time be propelled from left to right as viewed in FIG. 3 through the main guide means 2.

In the particular embodiment described in detail herein and illustrated in the accompanying drawings, the doughnuts 1 are to be sorted from a random condition into a predetermined arrangement of, for example, three aligned rows of doughnuts 1. For this purpose, the apparatus is provided with article separating means operably connected to and disposed within the main guide means 2, as well as one or more fixed or adjustable or variable guides 27 (see FIGS. 2, 3 and 4) which depend downwardly from transverse members 6 and 7 of the template guide structure 3 and have their lower extremities slightly above but not in contact with the upper surface of the top horizontal portions 18 of the louvers 17. The guides 27 together with the side walls of the frame structure must define the side portions of three channels through which the doughnuts 1 translate aerodynamically.

With reference to FIGS. 1, 2, 3, and 6, it should be noted that the article separating means assists the movement and sorting of the randomly distributed doughnuts 1 to move within the guide channels provided in part by the guides 27, and at the same time prevents any jam-ups or blockages of the doughnuts 1 which are being transported from left to right as viewed in FIG. 3. The article separating means may, for example, include one or more baffles 28 which are affixed to and depend downwardly from a transverse element 29. The baffles 28 are oriented in a parallel relationship with the guides 27.

There is also provided third means which are operably connected to the article separting means for selectively and adjustably moving the article separating means to prevent any jam-ups of the dougnuts 1 which are being transported, and also to facilitate and assist the movement of the randomly distributed doughnuts 1 into the channels provided by the template guide structure 3. Such third means may, for example, include a mechanism which continuously reciprocates the article separating means so that the baffles 28 will reciprocate back and forth parallel to the guides 27 and substantially coplanar therewith.

Such a mechanism may, for example, include a vibratory air cylinder 30 (FIG. 1) whose reciprocating output shaft 31 is connected to a member 32 which, in turn, is rigidly connected to a shaft 33. The shaft 33 is mounted for oscillatory movement within brackets 34 affixed to the side frame members 9 and 10. The center portion of the shaft 33 is rigidly connected to one end of a lever 35. The other end of the lever 35 is movably connected to a bracket 36 rigidly affixed to the transverse element 29 of the article separating means (see FIG. 6). Such movable connection may be provided by the arrangement illustrated in FIG. 6 which includes an aperture 37 provided in the lower end of lever 35 through the mid portion of which passes a threaded bolt 38 which is engaged with the bracket 36. Thus, the reciprocating motion of the air cylinder 30 is transmitted to the baffles 28 of the article separating means by way of the shaft 31, member 32, shaft 33, lever 35, bracket 36 and transverse element 29. Such reciprocating motion of the baffles 28 prevents any jamming of the doughnuts 1 being sorted and fed, and at the same time assists in urging the doughnuts 1 into the channels which are formed in part by the guides 27.

As mentioned hereinabove, the aerodynamic unscrambling apparatus according to the present invention not only automatically sorts and feeds the articles being handled on a bed of fluid, but affords much flexibility in stopping and starting the articles being handled in order to perform various operations thereon. In connection with the particular embodiment of the present invention herein described in detail and illustrated in the accompanying drawings, it may, for example, be desired to stop the doughnuts 1 near the exit section of the apparatus which is located in the right-hand portion of the view depicted in FIG. 3, in order to inject jelly or some other desirable substance into the interior of the previously baked and transported doughnuts 1. For this purpose, there may be provided a suitable mechanism such as, for example, air cylinders 39 and 40 each having a plurality of movable fingers 41 and 42, respectively, depending therefrom and associated therewith.

With reference to FIGS. 1, 3 and 4, the six fingers 42 may be rigidly interconnected with a transverse slat 43 whose mid portion is rigidly connected to a central plunger 44 movably controlled by the air cylinder 40. A similar structure and arrangement may be employed in connection with the air cylinder 39 and its associated six fingers 41.

With reference to FIGS. 3 and 4, the fingers 41 and 42 may be spaced apart by a distance which is equal to or slightly larger than the horizontal dimension of the doughnut 1 parallel to the longitudinal axis of the main guide means 2. Thus, when the fingers 41 and 42 are in their lowermost positions, they hold therebetween one doughnut 1 in each of the three channels or guides provided in the template guide structure 3. The three doughnuts 1 trapped between the fingers 41 and 42 may then have an operation performed thereon, as for example injecting such three doughnuts 1 with jelly in the interior thereof. After the jelly-injecting operation has been performed on these three doughnuts 1, the cylinder 40 causes the fingers 42 to rise thus permitting the rightmost louver 17 shown in FIG. 3 to cause the jelly-filled doughnuts to exit from the apparatus, while the fingers 41 remain in their lower position to prevent an untimely passing of the next few doughnuts 1 to the right and also to prevent an inadvertent discharge of doughnuts 1 which have not yet been filled with jelly.

It is significant to note at this point that when the doughnuts 1 are stopped by the fingers 41 or 42 at the exit section of the apparatus, that the pressure exerted upon the doughnuts 1 to the left of fingers 41 when such fingers are in their down condition is the same as the pressure exerted on the doughnuts 1 at the left end of the main guide section 2 because of the novel means of propulsion used in the present invention, viz, driven by fluid.

Although the particular embodiment described hereinabove and illustrated in the drawings shows three channels in the template guide section 3, it is to be understood that the present invention is flexible enough to accommodate and does indeed contemplate any number of channels in the template guide section 3 in order to arrive at and accomplish the desired predetermined arrangement of articles or products being handled. For example, if the articles being handled are packaged of cigarettes, then there may easily be provided a template guide structure 3 which has ten guide channels so that the carton of cigarettes may be presented with two layers of ten packages of cigarettes each. Furthermore, the mechanisms described hereinabove at the exit section of the apparatus can easily be employed for placing foil on such packs of cigarettes, or performing any other desired operation with the packs of cigarettes or other products being handled.

The present invention also contemplates a structure wherein the gaps 20 in the louvers 17 need not have the same dimension throughout the entire longitudinal extend of the apparatus. Furthermore, the width and other dimensions or the louvers 17 can be varied in order to give other desired results. For example, the width of the louvers 17 and the slots or gaps 20 can be varied at the exit section of the apparatus in order to give the articles being handled an additional shove or impulse by the fluid emerging from such louvers at the exit section.

The invention also contemplates the use of variable or adjustable louvers 17 in order to accommodate various sizes, shapes and weights of products and articles to be handled by the apparatus. Thus, it may be necessary to vary the size of the gaps 20 and the angle between top horizontal portion 18 and oblique portion 19 of the louvers 17 in order to accommodate a different size, shape and weight of product to be handled in order to assure that the product is provided with enough lift so that the product rides on a fluid layer without touching the top surface of horizontal portion 18.

The present invention also contemplates having a series of baffles (not shown) disposed between the blower 21 and the entrance portion of the air duct 16 in order to divert the air or other fluid being employed to the appropriate width dimensions of the apparatus to accommodate the various channels being employed in the apparatus. It is also to be understood that operation of the handle 25 in completely closing the louvers 24 will increase the pressure of the air emerging from the gaps 20.

Thus, it can be seen that the present invention provides a very flexible apparatus which can be employed for aerodynamically moving and sorting and feeding many different types of products. The invention contemplates a template guide structure 3 which may be adjustable in a vertical height dimension as shown by the arrangement in FIG. 7, as well as a template guide structure 3 which is variable and adjustable in many other dimensions and respects. In addition to the variability and adjustability of the template guide structure 3, the invention also contemplates interchanging various template guide structures to accommodate and handle the particular article to be sorted and fed. For this purpose, the arrangement and shape of the elements 4 may be varied, adjusted and/or interchanged to accommodate various shapes and configurations of articles to be processed. For example, such articles or products may have shapes which are substantially cylindrical, spherical, toroidal, prismatic, pyramidal, conical, etcetera.

It is also significant to note that the fluid which is the propulsion means being employed may be varied and adjusted to fit the articles being handled. This may be a significant aspect when it is imperative that the articles be free from contamination, or marred surfaces, asa is the case with various food products.

It will be evident from the description set forth hereinabove that there is herein provided a novel apparatus which satisfies all of the objects of the present invention, as well as others, including many advantages of great practical utility and commercial importance.

Furthermore, because many embodiments may be made of this inventive concept, and because many modifications and variations may be made of the particular embodiment hereinbefore shown and described, it is to be understood that all matter herein is to be interpreted merely as illustrative, and not in a limiting sense.

We claim:

1. An apparatus for automatically and selectively controllably transporting articles into a predetermined arrangement of said articles, comprising, in combination:
   main guide means;
   entrance guide means operably connected to and communicating with said main guide means;
   first means for transporting said articles into said entrance guide means;
   second means for selectively supplying and directing at least one fluid to said main guide means at a selectively adjustable and predetermined pressure and quantity, and at a selectively adjustable and predetermined direction;
   article separating means operably connected to and disposed within said main guide means;
   said articles being transported through said entrance guide means and into said main guide means wherein said articles are selectively adjustably and controllably transported along by said fluid; and
   said article separating means separating said articles into a selectively adjustable and predetermined arrangement of said articles as said articles are simultaneously transported along by said fluid.

2. An apparatus characterized substantially in accordance with claim 1, wherein:
   said main guide means includes a template guide structure which is shaped and dimensioned so as to permit said articles to move therethrough with a minimum of resistance and obstruction; and
   said articles pass through said template guide structure on a layer of said fluid.

3. An apparatus for automatically and selectively controllably transporting articles into a predetermined arrangement of said articles, comprising, in combination:
   main guide means;
   entrance guide means operably connected to and communicating with said main guide means;
   first means for transporting said articles into said entrance guide means;
   second means for selectively supplying and directing at least one fluid to said main guide means at a selectively adjustable and predetermined pressure and quantity, and at a selectively adjustable and predetermined direction;
   article separating means operably connected to and disposed within said main guide means;

said articles being transported through said entrance guide means and into said main guide means wherein said articles are selectively adjustably and controllably transported along by said fluid;

said article separating means separating means articles into a selectively adjustable and predetermined arrangement of said articles as said articles are simultaneously transported along by said fluid;

said main guide means includes a template guide structure which is shaped and dimensioned so as to permit said articles to move therethrough with a minimum of resistance and obstruction;

said articles pass through said template guide structure on a layer of said fluid; and said article separating means are operably connected to and depend from said template guide structure.

4. An apparatus characterized substantially in accordance with claim 3, including:

third means operably connected to said article separating means for selectively and adjustably moving said article separating means to prevent any jam-ups of said articles which are being transported.

5. An apparatus characterized substantially in accordance with claim 4, wherein:

said third means includes a mechanism which continuously reciprocates said article separating means.

6. An apparatus characterized substantially in accordance with claim 3, wherein:

said second means includes a plurality of adjustable louvers disposed beneath said template guide structure; and said template guide structure includes a series of elements which are spaced apart in a predetermined arrangement in order to facilitate the passage therealong of said articles.

7. An apparatus characterized substantially in accordance with claim 3, wherein:

said fluid is air;

said second means includes an air duct provided with a plurality of adjustable louvers; and said second means further includes a mechanism for blowing air into said air duct; and said second means further includes an air pressure regulating means for controlling the pressure of said air in said air duct; and said louvers of said air duct are disposed adjacent said template guide structure so that air is directed from said louvers into said template guide structure to transport said articles by means of one or more streams of air supplied by said second means.

8. An apparatus characterized substantially in accordance with claim 7, wherein:

said second means includes a plurality of louvers which direct said fluid into said main guide means at an angle which is obliquely oriented relative to the longitudinal axis of said main guide means.

9. An apparatus characterized substantially in accordance with claim 3, including:

third means operably connected to said article separating means for moving at least a portion of said article separating means in a direction which is substantially parallel to the longitudinal axis of said main guide means.

10. A method of utilizing the apparatus according to claim 3 for automatically and selectively controllably transporting articles into a predetermined arrangement of said articles, comprising the steps of:

transporting said articles into said entrance guide means;

moving said articles through said entrance guide means and into aid main guide means;

selectively adjustably and controllably transporting said articles through said main guide means by means of said fluid; and separating said articles into a selectively adjustable and predetermined arrangement of said articles as said articles are simultaneously transported through said main guide means by means of said fluid.

* * * * *